Dec. 16, 1947.                J. K. THOMPSON                2,432,948
                         ELECTRIC COIL TESTING DEVICE
                            Filed July 24, 1943

WITNESSES:

INVENTOR
Joseph K. Thompson.
BY
Paul E. Friedemann
ATTORNEY

Patented Dec. 16, 1947

2,432,948

UNITED STATES PATENT OFFICE 2,432,948

ELECTRIC COIL TESTING DEVICE

Joseph K. Thompson, Pittsburgh, Pa., assignor to Westinghouse Electric Corporation, East Pittsburgh, Pa., a corporation of Pennsylvania Application July 24, 1943, Serial No. 495,974

7 Claims. (Cl. 175—183)

My invention relates to electromagnetic devices for testing coils in particular as to their number of turns and the presence of short circuits between the turns.

Prior to assembling any type of coil for the final test it is often desirable to test for the proper number of turns and shorts. Such a test increases in value if the assembling operation is difficult, if other windings are subsequently wound over tested sections, and if the dismantling operation is difficult as in a motor.

A known and customary method of testing coils for shorts and number of turns consists in placing the coil to be tested over a ferromagnetic core structure with a primary or energizing winding on one portion or leg of the core structure to produce an alternating magnetic flux therein, and a standard coil of a known number of turns placed over another portion or leg. The number of turns of the test coil is determined by comparing or measuring the voltage induced therein by the alternating flux in relation to the voltage induced by the same flux in the standard coil. A short in the test coil is determined by detecting the flux distortion caused by the current flowing in the shorted section.

The known devices for performing these testing methods are exacting as to the attention required for obtaining satisfactory results and involve considerable errors as regards the accuracy of the measuring result. These drawbacks are mainly due to the relatively high reluctance of the flux path and the occurrence of a considerable leakage flux which are inevitable in such devices because of constructional requirements. That is, in order to permit the insertion and removal of the test coil, the magnetic circuit of the core structure must either be open, i. e. extend through air over an appreciable distance, or, if a yoke is used for closing the ferromagnetic flux path, the yoke must be removable and hence involve joints or air gaps. As a result, the flux distribution through the legs of the core structure is not uniform even if precautions are taken to keep the air gaps at a minimum. Therefore, a turn around the core leg near the energizing primary will link more flux than a turn near the open or yoke end of the core leg. Similarly, a shorted turn near the open or yoke end will produce less flux distortion than a short closer to the middle portion of the core body. Under these conditions, the measuring errors can be kept at a minimum only if the spacial distribution of the turns is identical in the test coil and standard coil when testing for number of turns. In a coil of many turns, this is nearly impossible to achieve. Thus the just mentioned magnetic conditions involve the exacting requirements that the standard reference coil be identical to the coil under test in its physical construction and the spacial location of its turns relative to one another and to the core body. For instance, a coil may appear to have an unsuitable number of turns while the indicated difference is caused merely by a slight spacial displacement of the turns relative to one another. Also a slight displacement of the whole test coil, for instance by not more than the thickness of a varnish bump, may lead to an erroneous indication. Any change in the air gaps or joints, such as caused by wear or inclusion of dirt, is also apt to affect the measuring result.

It is an object of my invention to provide coil testing devices which afford performing the above-mentioned testing methods while avoiding the difficulties and errors of the devices heretofore available for this purpose.

More specifically, the invention aims at reducing or eliminating the measuring errors and particular requirements due to the effect of the air gap on the flux uniformity in the known testing devices. Accordingly, it is an object to render the test results independent of slight displacements of the turns of a coil relative to one another and relative to the core portion or leg surrounded by them.

Another object of my invention is to eliminate or substantially reduce the disturbing effect on the test result of changes in the air gap or joint reluctance of the testing device caused by wear, foreign particles or the like influences.

Still another object is to provide a testing device for the purposes described, in which a single standard or comparative coil can be used for testing specimen coils of different numbers of turns not necessarily identical or even similar to the reference coil in physical construction.

A further object allied to those already mentioned is to render the magnetic flux in the magnetic core structure essentially uniform and largely independent of variations in the joints or air gaps of the removable yoke member of the testing device so as to increase thereby the accuracy of measurement while reducing the amount of care and attention required from the operator.

In order to achieve these objects and advantages in accordance with my invention, the testing device is designed so that only the standard coil and the specimen coil are arranged on the main core structure while the energizing primary coil for producing the alternating magnetic flux is disposed on the movable or removable yoke member of the structure. When in operation, the flux produced by the primary has to pass through the joints or air gaps before it enters the core body proper which has a uniformly low reluctance path and links itself with the standard and specimen coil placed on the core body.

According to another and subsidiary aspect, the invention provides a testing device designed as just mentioned in which a subdivided and tapped standard coil or a plurality of selective standard coils are used so that the coils to be tested may have different numbers of turns without requiring more than the setting of a selective contactor or the like adjusting member for rendering the device applicable to the particular test coil under observation.

In another aspect, the invention provides a variable and selectively adjustable circuit member arranged outside the testing device proper but arranged in the appertaining measuring circuit for adjusting the measuring range to a specimen under test while employing a universal standard coil for comparison with specimen coils of different numbers of turns.

The above-mentioned and other objects and features of the invention will be apparent from the following description of several embodiments taken in conjunction with the appertaining drawing in which.

Figure 4:
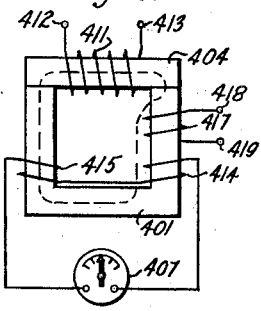

While the above-mentioned figures refer to the indication of the number of turns of a coil to be tested, Fig. 4 shows diagrammatically a similar device and its application to a test for determining the presence of short circuits between the turns of a coil.

Figs. 5 through 9 are explanatory views and serve to elucidate the operation of a testing device designed in accordance with the principles of my invention by comparing it with testing devices similar to those of the prior art and not in compliance with the requirements of the invention.

Figure 5:
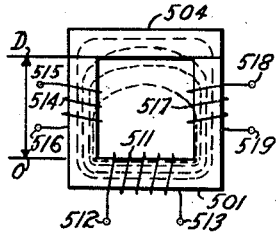
Figure 6:
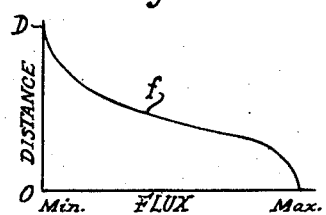

More particularly, Fig. 5 shows the flux distribution in a magnetic structure as heretofore used for testing purposes of the kind here in point having a high reluctance path for the flux enclosed by coils; while Fig. 6 represents a flux diagram relating to the same type of core structure.

Figure 7:
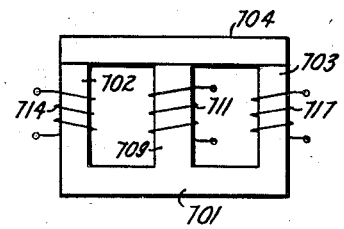

Fig. 7 shows another magnetic structure of the type heretofore in use, the diagram of Fig. 6 being in substance also applicable to the latter type of devices.

Figure 8:
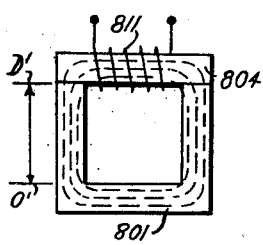
Figure 9:
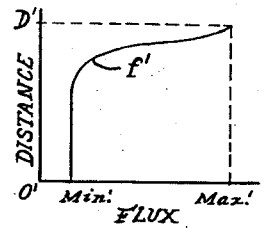

In comparison, Fig. 8 shows the flux distribution in a magnetic structure embodying the principles of this invention and Fig. 9 an appertaining flux diagram.

Figure 10:
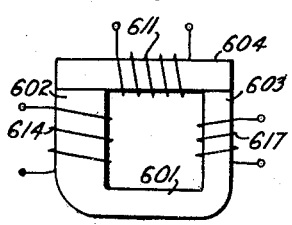

Fig. 10 represents a further embodiment of a testing device according to the invention.

Figure 1:
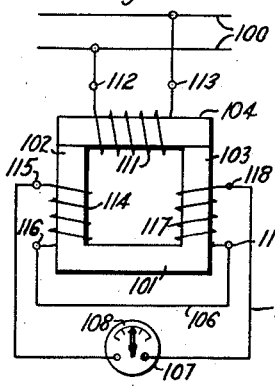
Figure 1 represents a diagram of a coil testing device according to the invention in connection with an electric energizing circuit and a measuring circuit for indicating the test result.

Referring to Fig. 1, numeral 101 denotes a substantially U-shaped laminated core body of ferromagnetic material, for instance alloy steel of high magnetic permeability and negligible magnetic remanence. The core body has two legs 102 and 103 extending in parallel to each other. The outer ends of these legs are bridged by a yoke 104 which is formed as a separate body and consists preferably also of a laminated structure of a highly permeable material of the kind just mentioned. The yoke 104 is removable from the core body 101. However, it may be linked at one end to leg 102 of the core body 101 so that the other end can be turned away or up from the respective leg. Another way of construction is to provide a slidable engagement between the yoke 104 and the legs 102 and 103, so that the yoke can be moved away from leg 103 to permit inserting and exchanging the specimen coil mentioned hereinafter.

The removable yoke 104 is provided with a primary coil 111 which serves to energize the electromagnetic test system. The terminals 112 and 113 of the primary coil 111 are connected to a suitable source 100 of alternating current. When the yoke is in proper position and the primary coil energized, a magnetic flux is passed through the magnetic structure which offers the flux an essentially closed ferromagnetic path interrupted by more reluctant material only at the joints or air gaps between the legs and the yoke 104.

A standard coil 114 of a known number of turns is arranged on leg 102. The specimen coil 117 to be tested is placed over leg 103. When performing the test, the terminals 115 and 116 of the standard coil 114 are connected by leads 105 and 106 with the corresponding terminals 118 and 119 of the specimen coil 117. An indicating or recording measuring instrument 107 is inserted into one of the connecting leads and is provided with a scale 108 or other means for indicating any difference between the number of turns of the specimen coil 117 and standard reference coil 114.

It will be seen from Fig. 1 that the two legs 102 and 103 of core body 101 are series arranged to each other in magnetic respect so that the same magnetic flux, generated by the primary winding 111, passes uniformly through both coils 114 and 117. Consequently, if the coils have the same number of turns, the same voltage is produced in each coil. The two secondary voltages thus obtained oppose and balance each other in the measuring circuit. Hence the instrument 107 will indicate zero on scale 108. However, if the specimen coil 117 has more or fewer turns than the standard coil 114, its secondary voltage will differ from that of the standard coil and will cause an unbalance current to flow through the measuring circuit. As a result the instrument 107 will deflect the extent of deflection being a measure of the difference in the number of turns.

While the measuring method involved in the test just described is essentially similar to the customary testing methods referred to in an earlier place of this specification, it will also be seen that the device according to the invention functions more advantageously than the known testing devices as regards the effect of air gaps and high reluctance points between the yoke 104 and the legs 102 and 103 of the core body. Due to the fact that the primary winding 111 is arranged on the yoke 104 while the standard coil and specimen coil are both placed on the core body proper, any variation in the gap reluctance will show up only as a variation in magnetizing current of coil 111 and hence will have no effect on the test result. The leakage flux is limited to the immediate neighborhood of the gap, and the flux portion actually introduced into the main core structure will have a continuous low reluctance path over the entire iron structure linking the standard and test coils.

Because of the uniform flux distribution in the main core body, all coils having the same number of turns will give the same indication regardless of their location along the flux path. It is not necessary that the spacial distribution be the same or that the coils be located on the test leg with any geometrical precision. Hence, a tapped coil having a proper number of turns can be used to test any coil of any shape having the same number of turns.

Figure 2:
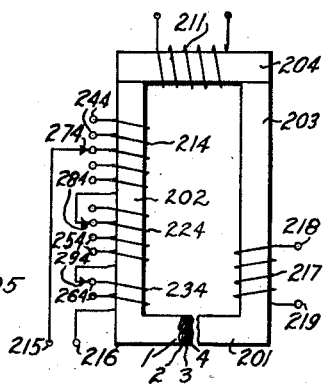
Fig 2 illustrates diagrammatically another embodiment of a testing device also in accordance with this invention.

A testing arrangement of the latter type is illustrated in Fig. 2. According to this figure, a core body 201 with two parallel legs 202 and 203 is provided with a yoke 204 which is removable from the core body to a sufficient extent to permit placing the specimen coil 217 over one of the legs. The core body 201 in Fig. 2 is shown as partly broken away in order to show some of the laminations denoted by 1, 2, 3 and 4. The reference winding arranged on leg 202 of the magnetic structure comprises, for instance, three groups of turns marked 214, 224, and 234. Each of these groups is tapped and connected with corresponding groups of contacts denoted by 244, 254 and 264, respectively. Each group cooperates with a slide contact 274, 284, 294, respectively. In this manner, a plurality of contact devices are formed which permit a selective adjustment of the reference winding as to the number of turns inserted between the terminals 215 and 216. The group of turns denoted by 214 has many windings, the group 224 has a smaller number of turns while the smallest number of turns is allotted to group 234. The gradation of the groups of turns and appertaining contacts is preferably chosen in accordance with a decimal system or a geometric progression so as to permit varying the effective number of turns over a relatively large range of adjustment. The terminals 215 and 216 of the reference winding and the terminals 218 and 219 of the specimen coil 217 are connected with a detector circuit and a measuring, indicating, or recording instrument which may be similar to the corresponding means illustrated in Fig. 1. Similarly, the primary coil 211 for energizing the magnetic system is arranged on the yoke 204.

While such a tapped or subdivided standard or reference winding can hardly be used in the known devices because of the above mentioned difficulties encountered therein, the uniformity of the magnetic flux over virtually the entire length of the core body in devices according to the invention makes it possible to employ this arrangement to advantage, and hence permits rendering one and the same testing device more versatile than the testing means heretofore available.

Since a tapped standard or reference coil may be used, it is also possible to so arrange the test circuit to indicate an excess or deficiency in the number of turns so that the coil to be tested can be compared to sections of the reference having the minimum and maximum number of allowable turns. This test procedure makes it unnecessary to actually determine the number of turns in the test coil; that is such a procedure is similar to the "go and no go" tests applied when testing mechanical fixtures by gauges which do not actually determine the dimensions of the tested specimen.

Since it is often necessary to test coils which have relatively few turns, the test circuit must have sufficient sensitivity to detect a difference of one or a few turns between the standard and test coils. For this reason, the indicating instrument is preferably used as a "null" voltage or current indicator. This null indicator may be a galvanometer, or a circuit combination such as a vacuum tube voltmeter, oscilloscope or the like complex device.

If the same device is used to test a coil having many turns (e. g. 50,000 or any large number), the test equipment will still give an equal deflection or indication for a one-turn difference, although a one-turn difference is important only when it represents an appreciable percentage of the total number of turns. Consequently, I propose in another aspect of this invention to employ a test circuit in which the magnitude of indication per one-turn difference will vary inversely with the number of turns in the coil under test. In accordance with this aspect, the basic sensitivity of one-turn difference is reduced in proportion to the required number of turns in the test coil. For example, one turn represents 2% difference in a coil of 50 turns, 1% in a coil of 100 turns, or 0.1% in coils of 1000 turns and approaches a wholly negligible value for coils of more turns.

For instance, if the turn difference allowed is set at 2%, I propose to diminish the sensitivity of the testing apparatus to 2% of the desired number of turns in the test coil. This would be 1 turn for a 50-turn coil, 2 turns for a 100-turn coil, 20 turns for a 1000-turn coil, and so forth. When performing this method, a sensitive voltage detector, such as an A. C. galvanometer or a rectifier system with a D'Arsonval movement or a vacuum tube voltmeter, oscilloscope, or wattmeter separately excited or the like apparatus, may be used in order to keep the test current at a minimum.

Figure 3:
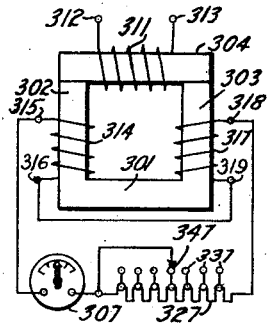
Fig. 3 represents a coil testing device similar to the one shown in Fig. 1 but provided with a different measuring circuit.

An embodiment of the just mentioned type is represented by Fig. 3. According to this figure, the magnetic core body 301 has a standard coil 314 arranged on its leg 302 and a specimen coil 317 arranged on leg 303. As in the proceeding embodiments, the two legs are magnetically bridged by a magnetizable yoke 304 which carries the primary winding 311 whose terminals 312 and 313 are to be connected with an alternating-current source. Terminals 315 and 316 of the standard coil 314 are connected with terminals 318 and 319 of the removable specimen coil 317 by a measuring circuit which contains a sensitive voltage detector at 307 and is also provided with a tapped impedance 327. The taps 337 form part of a selective switch arrangement, the movable switch contact being designated by 347. The impedance 327, or rather the magnitude of the impedance lying between each pair of taps, is so graduated along the path of motion of the contact member 347 that the rate of change of the resistance increases in the direction from the top to the bottom of the path of motion. Hence, relatively few turns or low impedance magnitudes are effective between the pairs of contacts at the top of the arrangement while the number of turns or the magnitude of the impedance is higher between the contacts of a pair closer to the bottom of the arrangement. By adjusting the movable contact 347, the sensitivity of the arrangement can be adapted to the particular specimen under observation.

If the switch 347 leaves the major portion of the impedance in series with the indicating means a large turn difference must be present to give indication. This would be the proper adjustment for testing a coil of many turns.

For a test coil of few turns, the impedance is more or less shunted out by adjusting the switch 347, thus increasing the over all sensitivity and enabling the detector to indicate as little as a one-turn difference.

The above-mentioned impedance should preferably be proportional to the voltage produced per turn on the test coil and the indicator so marked that each position of switch 347 corresponds to a proper range of turns for the coil to be tested.

Furthermore, if a fixed percentage difference is to be maintained between the standard and test coils, the indicator can be made to operate with an approximate half-scale deflection. More or less turns would thus give a reading in a more accurate scale position and no deflection would indicate an open coil with no separate test necessary for this important determination.

While the adjusting impedance is shown as a tapped series resistor in Fig. 3, it will be understood that other types of impedance devices and other circuit arrangements may be used instead for achieving the above-mentioned measuring function.

Fig. 4 shows a testing device similar to those of Figs. 1, 2 and 3 but applied for testing a specimen coil as to the presence of short circuits between the turns of the coil. The core body 401 carries identical balancing coils 414 and 415 whose terminals are connected in bucking connection with a meter 407 or the like measuring device or circuit for determining the absence of secondary voltage or current effective across the balancing coils when the primary winding 411 disposed on the yoke 404 is energized by connecting its terminals 412 and 413 to an alternating current source. The coil to be tested is denoted by 417. It is placed over one of the legs of the core body with its terminals 418 and 419 left open. If the specimen coil is free of shorts, the secondary balance indicated by 407 is not appreciably varied by placing the coil 417 over the legs. If, however, a short is present, the current flowing in the shorted turns produces a countermagnetomotive force which forces a portion of the flux to assume the path diagrammatically shown in Fig. 4 by a broken line. As a result, one portion of the balancing coil 414 will link less magnetic flux than the other portion. Consequently, the indicating instrument 407 will be affected by an unbalance current or voltage and produce a corresponding indication. It will be obvious from the foregoing explanation that the advantages of the invention are also effective in a testing arrangement of the latter type because the position of the test coil relative to the core leg has little effect on the indicator means.

The function and advantages of a device according to the invention will be more fully understood from the explanatory diagrams of Figs. 5 through 9.

Fig. 5 represents a magnetic structure for testing purposes of the kind here dealt with, the structure being designed similar to those heretofore known, and hence not in accordance with the present invention. The primary winding 511 is placed on the core body 501 proper. 512 and 513 denote the terminals of the primary coil. They are to be connected to an alternating-current source. 514 is the required unique reference coil with terminals 515 and 516, and 517 is the exchangeable specimen coil with terminals 518 and 519. The terminals of coils 514 and 517 which must be identical are to be connected in a measuring circuit similar to those employed in connection with the present invention. Due to the high reluctance of the joints and high leakage because the magnetic flux is not generated within the yoke member 504, the magnetic flux through the system has the approximate distribution indicated schematically by the dotted lines. The flux has its greatest density within the primary winding 511 and shows increasing leakage towards the gaps or joints between the ends of the legs and the adjoining yoke 504.

The flux density along one of the legs is diagrammatically shown in Fig. 6. In this diagram the abscissa represents flux densities, and the ordinate the distance from the base portion of the core structure along the leg, the total distance between the zero point O and point D being indicated in Fig. 5 by a line also marked O—D. The flux density represented by curve $f$ in Fig. 6 is a minimum at the air gap or joint and increases gradually to a maximum which appears close to the primary winding.

Substantially the same flux distribution obtains in a testing device of the type shown in Fig. 7. In the latter device, a W-shaped core body 701 is employed with three parallel legs 702, 703 and 709. The primary windings 711 are placed on the center leg 709 while the two other legs are occupied by the reference coil 714 and the removable specimen coil 717 respectively which must be identical. A yoke 704 is provided to bridge the three legs 702, 703 and 709. The similarity of flux distribution in either leg 702 or 703 to the one discussed with reference to Fig. 5 is due to the facts that the energizing coil 711 is disposed on the core body proper 701, and the flux is forced through the high reluctance of the joints with the yoke member 704.

In contrast to the arrangements just discussed, Fig. 8 shows schematically the flux distribution in the magnetic structure of a device according to the invention. Since the flux is generated by the primary coil 811 within the yoke member 804, the leakage flux is substantially limited to the immediate neighborhood of the gap or joints. Consequently, as stated in the foregoing, the flux is substantially uniform along the entire magnetic length of the core body 801 proper. This is apparent from the diagram of Fig. 9 showing the flux density in one of the legs with reference to the distance from the base portion of the core body, the total distance O'D' being indicated in Fig. 8 by a line also marked O'—D'. According to Fig. 9 the flux density is at a maximum (Max') near the yoke and drops in the leg portion close to the yoke to a minimum value (Min'). This value is maintained over the predominant portion of the length of the leg and is also effective in the base portion of the core body extending at a right angle to the leg.

The embodiment shown in Fig. 10 differs from those previously described in having the leg 602 and bottom portion of the core body 601 designed with a larger cross section than the leg 603 carrying the specimen coil 617. This permits keeping the reluctance of the flux path at a minimum for obtaining a uniform flux and low leakage without exceeding the maximum dimensions of the core required within the specimen coil. 604 denotes the yoke member, 611 the magnetizing primary, and 614 the reference coil.

While I have illustrated a limited number of embodiments, it will be obvious to those skilled in the art that many changes as to the shape and arrangement of the magnetic structure and coils are possible without departing from the principles and advantages of this invention.

For instance, one or both of the standard and specimen coils may also be arranged on the base portion of the core body rather than on the legs. Furthermore, the magnetizing coil, or this coil and the yoke member may be replaced by a permanent magnet for certain types of application.

It will also be apparent that a number of different measuring circuits may be connected to the coils of the device in order to indicate the number of turns or the occurrence of shorts as set forth in this specification. Therefore, I intend the above described embodiments to be considered as illustrative but not in a limiting sense as to the scope of my invention.

I claim as my invention:

1. An electric coil testing device comprising a substantially U-shaped laminated magnetizable core having leg portions arranged in magnetic series connection, a substantially straight ferromagnetic yoke for bridging said core so as to establish an essentially closed magnetic circuit through said core, an energizing primary winding arranged on said yoke, said yoke and said primary winding being removable from said core, a reference coil arranged on one of said leg portions, another of said leg portions being designed for removably accommodating a coil to be tested.

2. An electric device for the testing of coils, comprising a ferromagnetic and substantially U-shaped core body, a removable ferromagnetic yoke for bridging said body so as to provide an essentially closed ferromagnetic circuit when placed against said body, an energizing primary winding arranged on said removable yoke, a reference coil arranged on said core body, said core body having a free portion designed for removably accommodating a coil to be tested so that, during a test, the coil to be tested is traversed by a magnetic flux produced by said primary winding and of fixed proportion to the flux passing through said reference coil.

3. An electric device for the testing of coils, comprising a magnetizable and substantially U-shaped core body having two legs extending substantially in parallel to each other, a reference coil arranged on one of said legs, said other leg being designed for removably accommodating a coil to be tested, a magnetizable yoke for bridging said legs so as to establish together with said core body an essentially closed magnetic circuit, said yoke being movable relative to said core body so as to permit placing a coil to be tested on said other leg, and a primary energizing winding disposed on said movable yoke for passing magnetic flux through said legs.

4. An electrical coil testing device comprising a substantially U-shaped ferromagnetic core body, a removable ferromagnetic yoke for bridging said body in order to provide an essentially closed ferromagnetic circuit when placed against said body, an energizing primary winding arranged on said yoke so as to be removable together with said yoke, a standard winding arranged on said core body, said winding having taps so as to be subdivided into a number of groups of turns, said groups being different from one another as to the number of included turns, selective contact means connected with said taps for changing the total number of effective turns of said standard winding in accordance with the difference in the turn number of said groups, said core body being designed for accommodating a coil to be tested so that, during a test, the coil to be tested is traversed by a magnetic flux produced by said primary winding and of fixed proportion to the flux passing through said standard winding.

5. An electrical coil testing device comprising a substantially U-shaped ferromagnetic core body, a removable ferromagnetic yoke for bridging said body in order to provide an essentially closed ferromagnetic circuit when placed against said body, an energizing primary winding arranged on said yoke so as to be removable together with said yoke, a standard winding arranged on said core body, said winding having taps so as to be subdivided into a number of groups of turns, said groups being different from one another as to the number of included turns in accordance with a decimal gradation, selective contact means connected with said taps for changing the total number of effective turns of said standard winding, said core body being designed for accommodating a coil to be tested so that, during a test, the coil to be tested is traversed by a magnetic flux produced by said primary winding and of fixed proportion to the flux passing through said standard winding.

6. An electric coil testing device comprising a substantially U-shaped magnetizable core body having two series arranged portions, a standard coil arranged on one of said portions, said other core portion being designed for accommodating a coil to be tested, a magnetizable yoke for bridging said core body in order to establish an essentially closed magnetic circuit, said yoke being removable from said core body to permit placing the coil to be tested on said other core portion, a primary energizing winding disposed on said removable yoke for passing magnetic flux through said portions, a secondary circuit for connecting said standard coil with the coil to be tested, said circuit containing a measuring instrument and an adjustable impedance member for varying the sensitivity of said circuit.

7. An electrical coil testing device comprising a substantially U-shaped ferromagnetic core body, a removable yoke structure for bridging said body having magnetizing means for passing a magnetic flux through said body and forming together with said body an essentially closed ferromagnetic circuit when placed against said body, a reference coil on said core body, said core body being designed for accommodating a coil to be tested so that, during a test, the coil to be tested is traversed by a magnetic flux of fixed proportion to that passing through said reference coil.

JOSEPH K. THOMPSON.

REFERENCES CITED

The following references are of record in the file of this patent:

UNITED STATES PATENTS

| Number | Name | Date |
| --- | --- | --- |
| 1,707,009 | Hendry | Mar. 26, 1929 |
| 1,743,318 | Carrington | Jan. 14, 1930 |
| 1,329,949 | Blackwell et al. | Feb. 3, 1920 |
| 400,972 | Thomson | Apr. 9, 1889 |
| 1,110,151 | Steen | Sept. 8, 1914 |

FOREIGN PATENTS

| Number | Country | Date |
| --- | --- | --- |
| 449,623 | Great Britain | June 30, 1936 |

OTHER REFERENCES

Isaacson, Radio News, May 1931, pp. 989, 1025 and 1027.